(12) United States Patent
Li (10) Patent No.: US 10,122,686 B2
(45) Date of Patent: Nov. 6, 2018

(54) METHOD OF BUILDING A FIREWALL FOR NETWORKED DEVICES

(71) Applicant: MediaTek Inc., Hsinchu (TW)

(72) Inventor: Hungwen Li, Cupertino, CA (US)

(73) Assignee: MediaTek Inc., Hsinchu (TW)

(*) Notice: Subject to any disclaimer, the term of this patent is extended or adjusted under 35 U.S.C. 154(b) by 0 days.

(21) Appl. No.: 15/499,406

(22) Filed: Apr. 27, 2017

(65) Prior Publication Data
US 2018/0097777 A1 Apr. 5, 2018

Related U.S. Application Data

(60) Provisional application No. 62/403,221, filed on Oct. 3, 2016.

(51) Int. Cl.
*H04L 29/06* (2006.01)
*H04W 12/08* (2009.01)
*H04W 12/06* (2009.01)

(52) U.S. Cl.
CPC .......... *H04L 63/0245* (2013.01); *H04L 63/08* (2013.01); *H04L 63/104* (2013.01); *H04W 12/06* (2013.01); *H04W 12/08* (2013.01)

(58) Field of Classification Search
CPC .................................................. H04L 63/0245
See application file for complete search history.

(56) References Cited

U.S. PATENT DOCUMENTS

| | | | | |
|---|---|---|---|---|
| 6,377,577 B1* | 4/2002 | Bechtolsheim | ......... | H04L 45/50 370/389 |
| 8,572,717 B2* | 10/2013 | Narayanaswamy | ......... | H04L 63/0245 726/12 |
| 8,908,526 B2* | 12/2014 | Perlman | ............. | H04L 12/4641 370/236 |
| 2011/0196971 A1* | 8/2011 | Reguraman | ............. | H04L 45/00 709/228 |
| 2014/0143854 A1* | 5/2014 | Lopez | ................ | H04L 63/0218 726/14 |

OTHER PUBLICATIONS

Palo Alto Networks, "The PA-5000 Series Architecture: The Evolution of the Single-Pass Parallel Processing Architecture", 2013. https://www.arm.com/products/security-on-arm/trustzone, retrieved from the Internet on Apr. 27, 2017.

* cited by examiner

*Primary Examiner* — Teshome Hailu
*Assistant Examiner* — Thanh Le
(74) *Attorney, Agent, or Firm* — Tong J. Lee (57) ABSTRACT

A device is provided to perform secure operations in a network that includes multiple devices. The device comprises multiple processor cores; multiple physical ports to receive packets; a system interconnect and a network security engine. The network security engine is operative to: extract a key from a packet received from a physical port among the physical ports; in response to a first determination that the key does not match a stored key in the device, block the packet from entering the system interconnect through the physical port; and in response to the first determination that the key matches the stored key and in response to a second determination that one or more identifiers extracted from the packet do not match stored information in the device, block the packet from entering an identified processor core among the processor cores that is to be accessed by the packet.

22 Claims, 5 Drawing Sheets

METHOD OF BUILDING A FIREWALL FOR NETWORKED DEVICES

CROSS-REFERENCE TO RELATED APPLICATIONS

This application claims the benefit of U.S. Provisional Application No. 62/403,221 filed on Oct. 3, 2016.

TECHNICAL FIELD

Embodiments of the invention relate to a firewall security mechanism that can be enabled on networked devices.

BACKGROUND

Firewalls for servers and datacenters have been developed to defend security attacks. Existing methods and algorithms for server and datacenter firewalls generally demand a significant amount of computing power and memory resources. Hence, they are not feasible for endpoints (e.g., clients), especially not for constrained endpoints such as Internet-of-Things (IoT) clients. Furthermore, the traditional firewalls are not scalable with the size of the network and cannot handle a large IoT network with millions or billions of endpoints.

A known advanced firewall, such as a third generation firewall based on the application layer (layer 7) of the Open System Interconnection (OSI) model, is able to detect when an unwanted application or service is attempting to bypass the firewall, or when a communication protocol is being abused by a malicious attacker. This firewall architecture builds extensive databases to store all previously known attack patterns and the knowledge of "from whom and where the attacks came." These databases are very large (e.g., terabytes) and can grow quickly as more attacks occur. The sizes of such databases make them infeasible for IoT clients having limited resources. Therefore, there is a need for a reliable, effective and scalable firewall mechanism for networked devices.

SUMMARY

In one embodiment, a method is provided for secure operations of a device in a network including a plurality of devices. The method comprises: extracting a key from a packet received from a physical port of the device, wherein the device includes a plurality of processor cores which are connected to the physical port via a system interconnect; in response to a first determination that the key does not match a stored key in the device, blocking the packet from entering the system interconnect through the physical port; and in response to the first determination that the key matches the stored key and in response to a second determination that one or more identifiers extracted from the packet do not match stored information in the device, blocking the packet from entering an identified processor core among the processor cores that is to be accessed by the packet.

In another embodiment, a device is provided to perform secure operations in a network including a plurality of devices, The device comprises: a plurality of processor cores; a plurality of physical ports to receive packets; a system interconnect coupled to the processor cores and the physical ports; and a network security engine coupled to the processor cores and the physical ports. The network security engine is operative to: extract a key from a packet received from a physical port among the physical ports; in response to a first determination that the key does not match a stored key in the device, block the packet from entering the system interconnect through the physical port; and in response to the first determination that the key matches the stored key and in response to a second determination that one or more identifiers extracted from the packet do not match stored information in the device, block the packet from entering an identified processor core among the processor cores that is to be accessed by the packet.

In yet another embodiment, a system is provided to perform secure operations in a network. The system comprises: a plurality of devices; and a gateway coupled to the devices via the network to manage the devices. At least one of the devices further comprises: a plurality of processor cores; a plurality of physical ports to receive packets; a system interconnect coupled to the processor cores and the physical ports; and a network security engine coupled to the processor cores and the physical ports. The network security engine is operative to: extract a key from a packet received from a physical port among the physical ports, wherein the key includes a group name identifying a group of the devices; in response to a first determination that the key does not match a stored key in the device, block the packet from entering the system interconnect through the physical port; and in response to the first determination that the key matches the stored key and in response to a second determination that one or more identifiers extracted from the packet do not match stored information in the device, block the packet from entering an identified processor core among the processor cores that is to be accessed by the packet

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a firewall that defends against security attacks for a networked device, such as an endpoint with limited computing power and memory resources. A network system may include a large number of endpoints, and each endpoint is locally equipped with a firewall. These firewalls collectively form a distributed firewall system that can easily scale to handle any number of endpoints with a high security level.

An embodiment of the firewall, also referred to as a network security engine or the Chipwall, is built on layer 4 (i.e., the transport layer) and layer 5 (i.e., the session layer) of the OSI model. In one embodiment, an endpoint may be a semiconductor chip that includes computing and memory resources; e.g., System-on-a-Chip (SoC). However, it is understood that the network security engine described herein is also applicable to a gateway or server for which the computing and memory resources are located on more than one chip. The network security engine may be implemented in hardware, software, or a combination of both. In one embodiment, the network security engine uses identifiers (IDs), keys and cryptography to monitor and protect the physical ports, processor cores and memory in a networked device.

In one embodiment, the network security engine identifies potential attackers based on mismatched key patterns and IDs. Thus, the network security engine does not need to build a large database for previously known attack patterns as some of the existing firewalls do, and the saving in memory size and computing power is significant. In this regard, the network security engine is well-suited for resource-constrained network devices, such as the endpoints in a network system. Although a small amount of resource is used, the network security engine is effective in protecting physical ports, processor cores and memory in a networked device. By having each networked device equipped with its own network security engine, the entire system containing a large number of networked devices can remain secure.

The network security engine is highly scalable. By using the network security engine in each device, the security of the system scales with the size of the system. Thus, the network security engine applies well to a small system as well as to a large server system or large datacenter.

Figure 1:
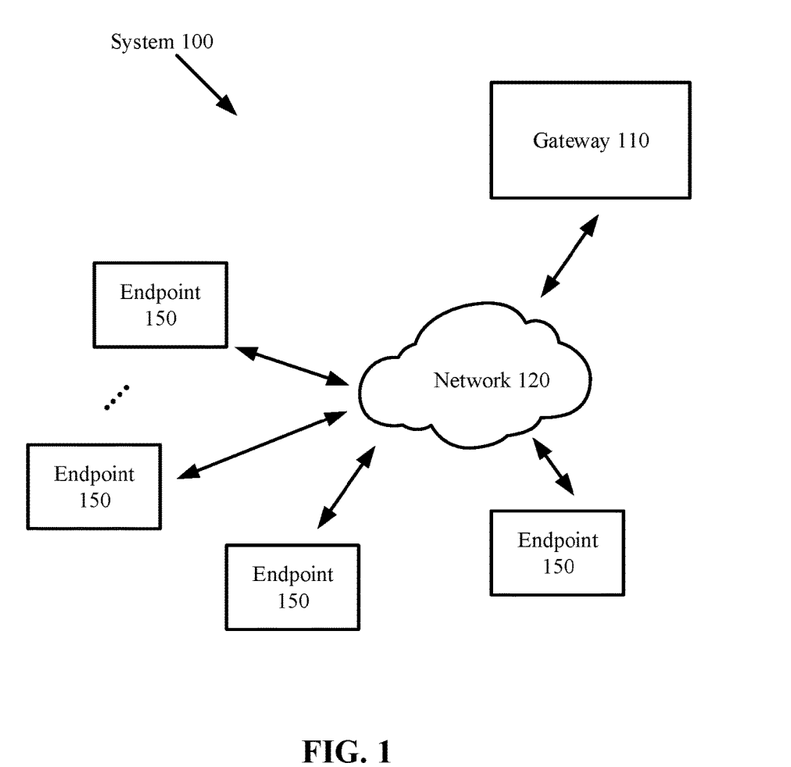
FIG. 1 illustrates a system including a number of endpoints connected to a gateway in a network according to one embodiment.

FIG. 1 illustrates an example of a system 100 in which embodiments of the invention may operate. The system 100 includes at least one gateway 110 (e.g., one or more servers or server clouds) connected to a network 120. The network 120 may be a public network, a proprietary network, a wireless network, a wired network, or any combinations of the above; e.g., a cellular network, the Internet, a wide-area network, a Wi-Fi network, a local area network, a personal area network, etc. Via the network 120, the gateway 110 is connected to a number of endpoints 150 (i.e., clients). The endpoints 150 may include computing devices, communication devices, appliances, vehicles, network nodes, or any networked devices that use firewalls for data security. Each endpoint 150 may be the same type of endpoint; alternatively, some of the endpoints 150 may be different from some of the other endpoints 150. Each endpoint 150 can receive and transmit data over the network 120, and each endpoint 150 is protected by an embodiment of the network security engine against potential attacks. The endpoints 150 may be organized as multiple groups, and each group is identified by a group ID; e.g., a device_family_name.

In one embodiment, the group ID may be a key pattern. The group ID is known to the gateway 110 and all endpoints 150 in the same group. For example, the group ID may be provided by the manufacture of the endpoints 150, exchanged between the endpoints 150 in the same group, exchanged between the gateway 110 and the endpoints 150 in the same group, computed dynamically during operation, etc. The group ID may be used by the gateway 110 and the endpoints 150 to encrypt outgoing messages and decrypt incoming messages. An endpoint 150 may broadcast a message to its group members by specifying the group ID or its derivative form in the message. For example, the derivative form may be an alias of the group ID. An endpoint 150 may receive a message when the group ID or its derivative form in the message matches its stored group ID or its derivative form.

In the following description, it is assumed that authentication among the gateway 110 and the endpoints 150 is performed with a single key (e.g., the group ID). Thus, a sender (i.e., the source) of a message is authenticated if the group ID in the message matches the group ID stored at the receiver. However, it is understood that the gateway 110 and the endpoints 150 may use a multi-factor key that includes not only the group ID but also one or more other key patterns (e.g., derivative forms of the group ID) for authentication.

Figure 2:
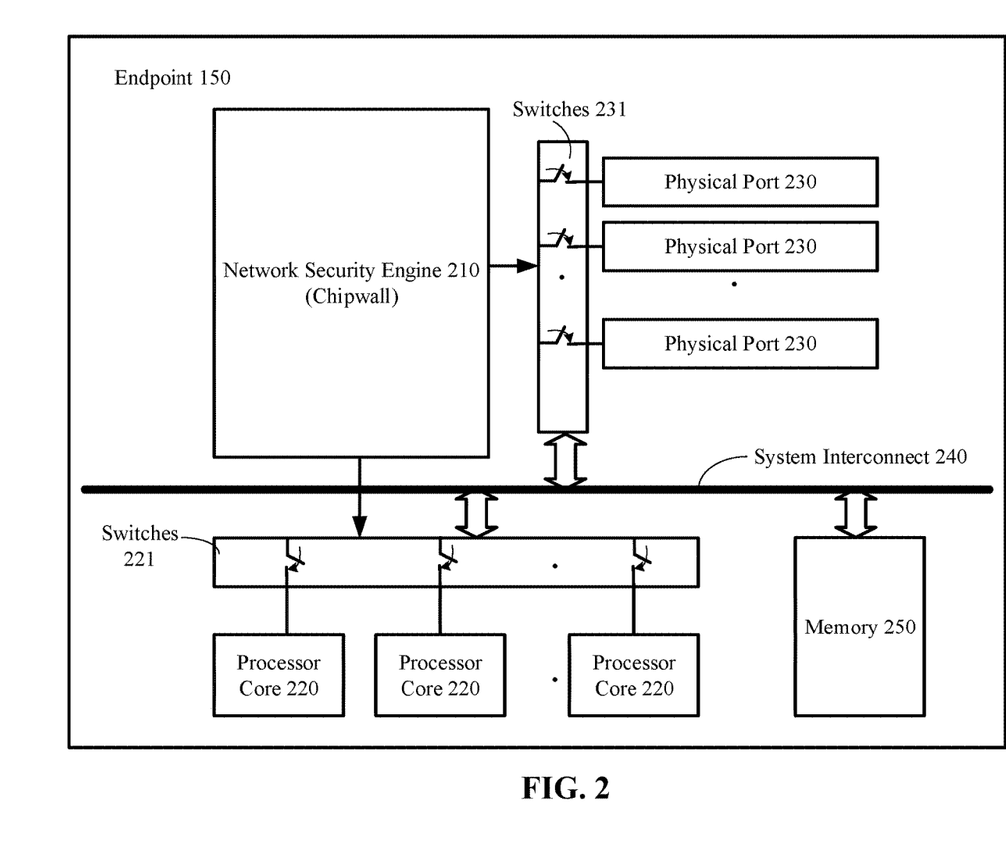
FIG. 2 illustrates a networked device according to one embodiment.

FIG. 2 illustrates a network security engine 210 in the endpoint 150 according to one embodiment. In some embodiments, the gateway 110 may also include the network security engine 210 protecting the gateway 110 from security attacks.

The network security engine 210 may be part of a SoC containing a number of processor cores 220_1, 220_2, . . . , 220_n (collectively referred to as the processor cores 220) and a number of physical ports 230_1, 230_2, . . . , 230_m (collectively referred to as the physical ports 230). Each processor core 220 contains processing units, registers and caches where sensitive data may be subject to security attacks. The processor cores 220 may include general-purpose processing units (e.g., central processing units (CPUs), etc.), special-purpose processing units (e.g., digital signal processors (DSPs), etc.) or a combination of both. In one embodiment, the processor cores 220 are connected to a system interconnect 240 via respective switches 221. The switches 221 may be physical switches that can be controlled by the network security engine 210 to open (disabling the connection between a respective processor core and the system interconnect 240), or close (enabling the connection between a respective processor core and the system interconnect 240). In an alternative embodiment, the switches 221 may be logical switches that can be controlled by the network security engine 210 to open for a certain packet stream (blocking the certain packet stream from the system interconnect 240 to enter a respective processor core), or close for a certain packet stream (allowing the certain packet stream from the system interconnect 240 to enter a respective processor core).

The endpoint 150 also includes a memory 250, which may include a combination of volatile and non-volatile memory such as read-only memory, random access memory, flash memory, solid state memory, etc.

Through the physical ports 230, the endpoint 150 may communicate with the gateway 110 (FIG. 1) and other endpoints 150. Each physical port 230 carries data traffic from a physical medium (layer 1) to layer 2, layer 3 and layer 4 of the ISO model. In one embodiment, the physical ports 230 may be connected to the system interconnect 240 via respective switches 231. The switches 231 may be physical switches that can be controlled by the network security engine 210 to open (disabling the connection between a respective physical port and the system interconnect 240), or close (enabling the connection between a respective physical port and the system interconnect 240). In an alternative embodiment, the switches 231 may be logical switches that can be controlled by the network security engine 210 to open for a certain packet stream (blocking the certain packet stream from the respective physical port from entering the system interconnect 240), or close for a certain packet stream (allowing the certain packet stream from the respective physical port to enter the system interconnect 240).

The network security engine 210 controls each switch 221 and each switch 231 to build a firewall surrounding the system interconnect 240, each processor core 220 and each physical port 230. The network security engine 210 monitors the incoming data traffic over the physical ports 230 and protects the processor cores 220 and the memory 250 from security attacks. When an abnormality is detected in the data traffic that arrives via a given physical port 230, the network security engine 210 may open up a corresponding switch 221 and/or open up a corresponding switch 231. In one embodiment, the abnormality may be indicated by a mismatched key, a mismatched process ID, or a mismatched memory address.

Figure 3:
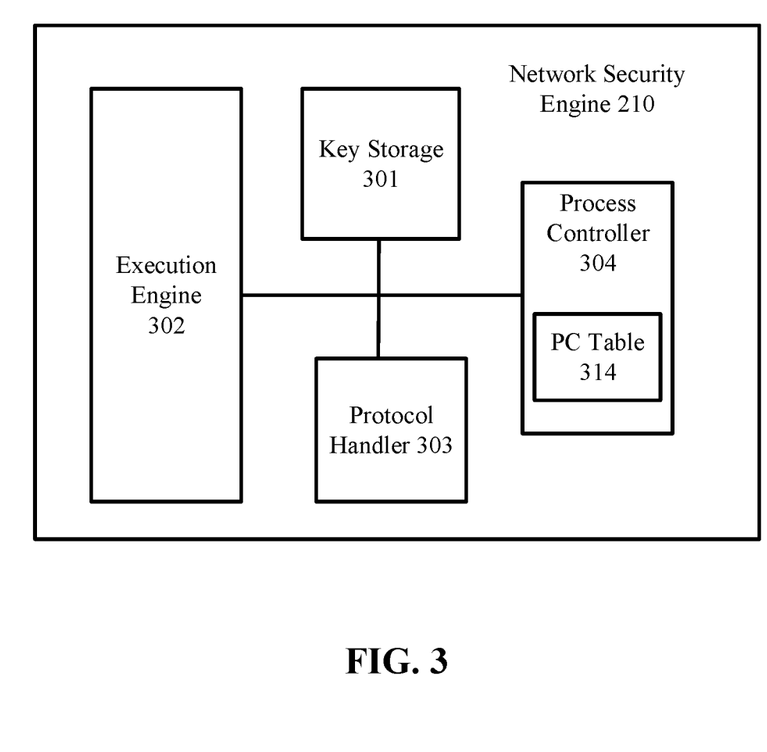
FIG. 3 illustrates a network security engine in a networked device according to one embodiment.

FIG. 3 illustrates an example architecture of the network security engine 210 according to one embodiment. In this embodiment, the network security engine 210 includes at least four functional components: key storage 301, an execution engine 302, a protocol handler 303, and a process controller 304. It is understood that the network security engine 210 may include additional components which are omitted from FIG. 3 for simplicity of illustration.

In one embodiment, the key storage 301 is a memory component that stores IDs, keys, signatures and certificates, which are collectively called keys. The network security engine 210 may use several types of keys; e.g., device_ID, device_family_name (a.k.a. group ID), two_factor_device_name, three_factor_device_name, etc. to authenticate an incoming packet. Although only one key is used in the following description, it is understood that the described embodiments are applicable to the network security engine 210 when using multiple keys to authenticate an incoming packet.

The protocol handler 303 continuously monitors packet streams arriving at each physical port 230, and executes the following operations: extract a key from a physical port, extract a process ID from a physical port, extract an address identifier or a target object identifier from a physical port, extract a heartbeat, and other operations to conduct layers 1-4 protocols. The protocol handler 303 may interrupt the execution engine 302 when any of these extract operations is performed.

In one embodiment, the process controller 304 may be part of the operating system (OS) kernel that performs the assignment of a process to a processor core 220, and the allocation of memory pages to a process or a processor core 220. The process controller 304 tracks the assignments and allocations with one or more data structures; e.g., a process control (PC) table 314. In one embodiment, an entry of the PC table 314 may contain a process ID that identifies a process executed by the endpoint 150; a processor core 220 to which the process is assigned, and the memory pages (or the corresponding address range) allocated to the process.

The entries of the PC table 314 may be built by the OS kernel running in the endpoint 150 during the execution of an application that contains multiple processes, and one entry is built for each process.

When the protocol handler 303 extracts a process ID from a received packet, it forwards the process ID to the process controller 304. The process controller 304 compares the received process ID to all process IDs stored in the PC table 314. The process controller 304 reports to the execution engine 302 whether the received process ID matches a stored process ID in the PC table 314.

The process controller 304 also compares the received address identifier with the address range stored in the PC table 314. The process controller 304 reports to the network security engine execution engine 302 whether the received address identifier is in an address range in the PC table 314. If there is a match, it means that there is a processor core 220 that is allocated with a memory page in the address range.

Figure 4:
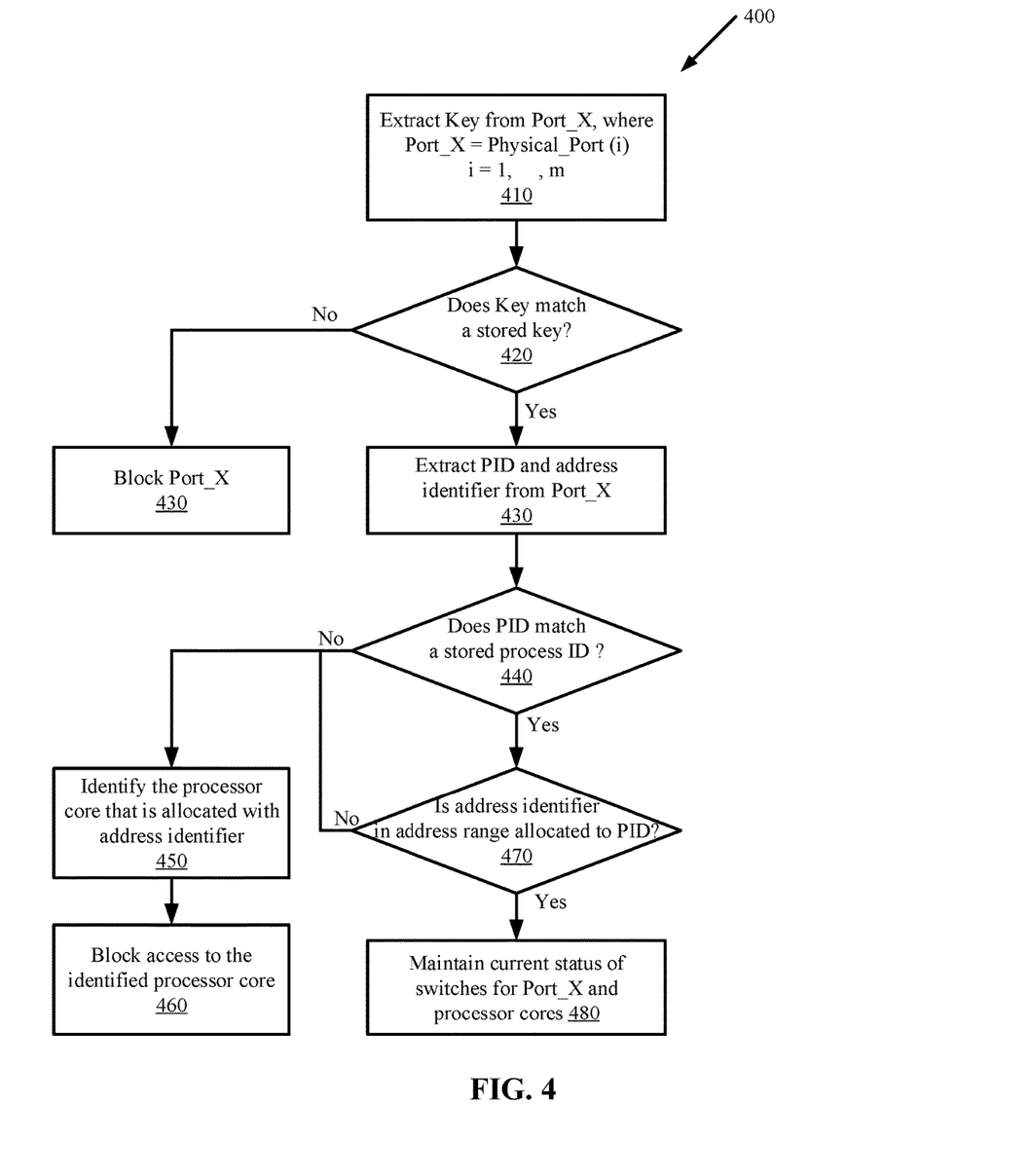
FIG. 4 is a flow diagram illustrating a method performed by a network security engine in a networked device according to an embodiment.

FIG. 4 is a flow diagram illustrating a method 400 performed by the network security engine 210 according to one embodiment. In this example, only one key is used for authentication; it is understood that in alternative embodiments more than one key may be used.

Referring also to FIGS. 2 and 3, for each physical port Port_X (where Port_X=Physical_Port (i), i=1, . . . m), the network security engine 210 monitors the incoming packets at Port_X, and extracts a key (referred to as "Key") from each packet (step 410). If the Key matches a stored key (step 420) as expected in a normal execution, the network security engine 210 may further look into the process ID (referred to as "PID") indicated in the packet. If the Key does not match a stored key (step 420), the execution engine 302 blocks the packet from Port_X (step 430); for example, by opening the corresponding (physical) switch 231 that connects Port_X to the system interconnect 240.

In an alternative embodiment, the received packet from Port_X may include an identifier that identifies a packet stream to which the received packet belongs; e.g., a session ID. If the Key does not match a stored key (step 420), the execution engine 302 blocks the packet from Port_X (step 430); for example, by opening the corresponding (logical) switch 231 to terminate the packet stream identified by the session ID. In this alternative embodiment, other packet streams identified by other session IDs can still enter the system interconnect 240 via Port_X.

If the Key matches a stored key (step 420), the network security engine 210 may further extract a PID and an address identifier from the packet received at Port_X (step 430). An example of an address identifier is a memory address identifying a data location or a memory page. If the PID does not match any stored process IDs (step 440), the execution engine 302 may use the process controller 304 to find the processor core 220 allocated with the memory location or page identified by the address identifier (step 450). After the processor core 220 is identified, the execution engine 302 blocks the received packet from reaching the identified processor core 220 (step 460); e.g., by opening the corresponding (physical) switch 221 that connects the system interconnect 240 to the identified processor core 220. Alternatively, the execution engine 302 may block the received packet by opening the corresponding (logical) switch 221 to terminate the packet stream identified by the session ID carried by the received packet. In this alternative embodiment, other packet streams identified by other session IDs can still reach the identified processor core 220 via the system interconnect 240.

If the PID matches a stored process ID (step 440), the execution engine 302 may use the process controller 304 to identify the memory address range allocated to the PID and the processor core 220 to which the PID is assigned. If the extracted address identifier is not in this address range (step 470), it indicates a possible attack may occur to the identified processor core 220 to which the PID is assigned. Thus, the execution engine 302 may block the received packet from reaching the identified processor core 220 (step 460); e.g., by opening the corresponding (physical) switch 221 that connects the system interconnect 240 to the identified processor core 220. Alternatively, the execution engine 302 may block the received packet by opening the corresponding (logical) switch 221 to terminate the packet stream identified by the session ID carried by the received packet. In this alternative embodiment, other packet streams identified by other session IDs can still reach the identified processor core 220 via the system interconnect 240.

In one embodiment, the received packet may include a field that includes a target object identifier identifying a target object to which the received packet attempts to access. The target object may have an allocated memory location to be processed by a processor core 220. In addition or alternative to step 470, the network security engine 210 may test whether that allocated memory location is in the address range allocated to the PID.

The execution engine 302 may use the process controller 304 to identify the memory address range allocated to the PID and the processor core 220 to which the PID is assigned. If the target object's allocated memory location is not in the address range, it indicates a possible attack may occur to the identified processor core 220 to which the PID is assigned. Thus, the network security engine execution engine 302 may block the received packet from reaching the identified processor core 220 (step 460); e.g., by opening the corresponding (physical) switch 221 that connects the system interconnect 240 to the identified processor core 220. Alternatively, the execution engine 302 may block the received packet by opening the corresponding (logical) switch 221 to terminate the packet stream identified by the session ID carried by the received packet. In this alternative embodiment, other packet streams identified by other session IDs can still reach the identified processor core 220 via the system interconnect 240.

If the Key matches a stored key (step 420), the PID matches a stored process ID (step 440), and the address identifier (or the target object's allocated memory location) is in the address range allocated to the PID (step 470), the network security engine 210 maintains the current status of switches 221 and 231 for Port_X and the processor cores 220 (step 480), thus allowing the received packet to reach its destination processor core for processing.

In some embodiments, the extraction of the Key, the PID and the address identifier may be performed in the same step, or two or more different steps when a packet is received. In some embodiments, the packets received at multiple physical ports may be examined in parallel for mismatched Key, PID or address identifier. In some other embodiments, the packets received at the physical ports may be examined sequentially for mismatched Key, PID or address identifier.

Referring back to the embodiment of FIG. 2, the network security engine 210 may implement a "reset" feature that re-activates (i.e., close or enables) all of the open (i.e., disabled) connections between the physical ports 230 and the system interconnect 240, and between the system interconnect 240 and the processor cores 220. In one embodiment, each endpoint 150 may periodically broadcast a heartbeat message including a group ID to re-activate the switches 221 and 231 in other endpoints 150 belonging to the same group (i.e., group members). Each endpoint 150 includes a timer that can be configured independently of the other timers in its group members to set the time interval between the consecutive heartbeat broadcasts. Thus, different endpoints 150 may broadcast the heartbeat messages at different intervals. In one embodiment, the gateway 110 may also periodically broadcast the heartbeat message to all the endpoints 150 in its group, according to its timer that can be configured independently of the timers in the endpoints 150. Thus, the gateway 110 may broadcast the heartbeat message at a different interval from the endpoints 150 in its group. In an alternative embodiment, each endpoint 150 may implement a "self-reset" mechanism that re-activates all of the open connections periodically based on a configurable internal timer.

When an endpoint 150 detects the heartbeat message broadcast by the gateway 110 or the other endpoints 150 in its group, the endpoint 150 closes all of its switches 221 and 231 that are currently open. The heartbeat message enables the endpoint 150 to return to its original state of full-capacity with respect to the physical ports 230 and the processor cores 220. The sending and receiving of the heartbeat messages may be performed in parallel with the security operations of FIG. 4.

In one embodiment, the gateway 110 may manage multiple groups of endpoints 150, with each group identified by a different group ID. For each group, the gateway 110 and its group members (i.e., endpoints 150 belonging to the same group) may be provided with multiple group IDs, but only one is in use at a time. The gateway 110 or its group members may determine to change from one group ID to another for any of these groups. The change may be triggered by a pre-determined condition (e.g., fixed time intervals) or by an event. Change of group IDs may reduce the chances that an attacker obtains the group ID in current use. In one embodiment, the gateway 110 and its group memory may dynamically compute a new group ID during operation of the system 100. For example, the gateway 110 and its group members may use the TLS or Datagram Transport Layer Security (DTLS) to dynamically change the group ID.

The following example refers to FIGS. 1-4 where the system 100 of FIG. 1 is an IoT network including millions of IoT devices as the endpoints 150. The IoT devices may be organized or configured as groups, with each IoT device being a semiconductor chip (e.g., SoC). Thus, in the following description the terms "IoT device" and "chip" may be used interchangeably. An example of a group includes an IoT gateway (e.g., the gateway 110) managing thousands, millions, or even billions of IoT devices. At the provision stage, the gateway and the endpoints under its management share one group ID. In some embodiment, one gateway may manage multiple groups of IoT devices. In such a case, the gateway associates each group with one distinct group ID such that different groups are identified by different group IDs.

In one embodiment, the IoT gateway and IoT devices may use DTLS as the communication protocol to establish a secure session and exchange data or messages, including the heartbeat messages. Under the DTLS protocol, the packet stream of a session is identified by a session ID. If it is detected at a physical port that the packet stream carries a mismatched key, under the DTLS protocol the DTLS session is terminated. That is, the open/close status of the switches 231 is logical; namely, there is no physical switch to be physically opened or closed. When a switch 231 is opened, it means that the DTLS session is terminated. In one embodiment, the protocol handler 303 keeps track of the DTLS session status for each physical port 230.

Referring to FIG. 3, the group ID for each group may be provisioned at the factory and stored in the key storage 301 of each IoT device. The process ID and the corresponding processor core and memory addresses are stored in the PC table 314. The PC table 314 is built and updated during operation of the system. In one embodiment, the OS (or kernel) running in the networked device can build the PC table 314.

To simplify the description, only one key (the device_family_name or group ID) is used as an example. Each chip under the protection of the network security engine 210 is provisioned with a device_family_name key at the manufacturing or in the field. The device_family_name may also be computed at the establishment of a secure session. The device_family_name key may be a bit pattern. At provision, the IoT devices that are configured to belong to the same group share the same device_family_name. During communication, the device_family_name appears in every message and can be extracted by network security engine 210.

To defend against potential security attacks, each of the IoT devices executes the operations of FIG. 4 independently and in parallel. There are two types of attacks that each IoT device is protected against:

(1) Attack with a wrong key. With a proper provision, only the devices belong to the same group share the same device_family_name. An attacker may use the wrong key to attack the device. As mentioned before in connection with FIG. 4, the network security engine 210 defends this type of attack successfully by blocking the attacker at the physical port from which the attacking data traffic is received. (2) Attack with a correct key. It is possible that an attacker obtains the correct group ID from another device or by randomly making a correct guess. Under such an attack, the network security engine 210 uses process ID and the associated memory address to protect the processor cores 220. Since the process ID is generated dynamically inside a device, an attacker not only need to have the correct key, but also have to have the correct process ID as well as the correct address identifier pointing to the memory addresses allocated to the correct process ID. Thus, the network security engine 210 can successfully protect a networked device from attacks.

The network security engine 210 can be deployed in each of the IoT devices to form a highly scalable distributed security system. System security is achieved by aggregating the security of each chip in the network. The distributed security system has several aspects such as: the decision to open or close a switch for each physical port is made locally in each IoT device; the decision to open or close a switch for each processor core is made locally in each IoT device; the key storage 301 is provided per device; the PC table 341 is provided per IoT device. The network security engine 210 performs totally distributed operations and maintains local databases. Each operation is local to the chip where the network security engine 210 resides. The databases used by network security engine 210 is local without dependence on information outside the chip. With the distributed operations and local database, the network security engine 210 is applicable to all sizes of systems without compromise of data security.

Figure 5:
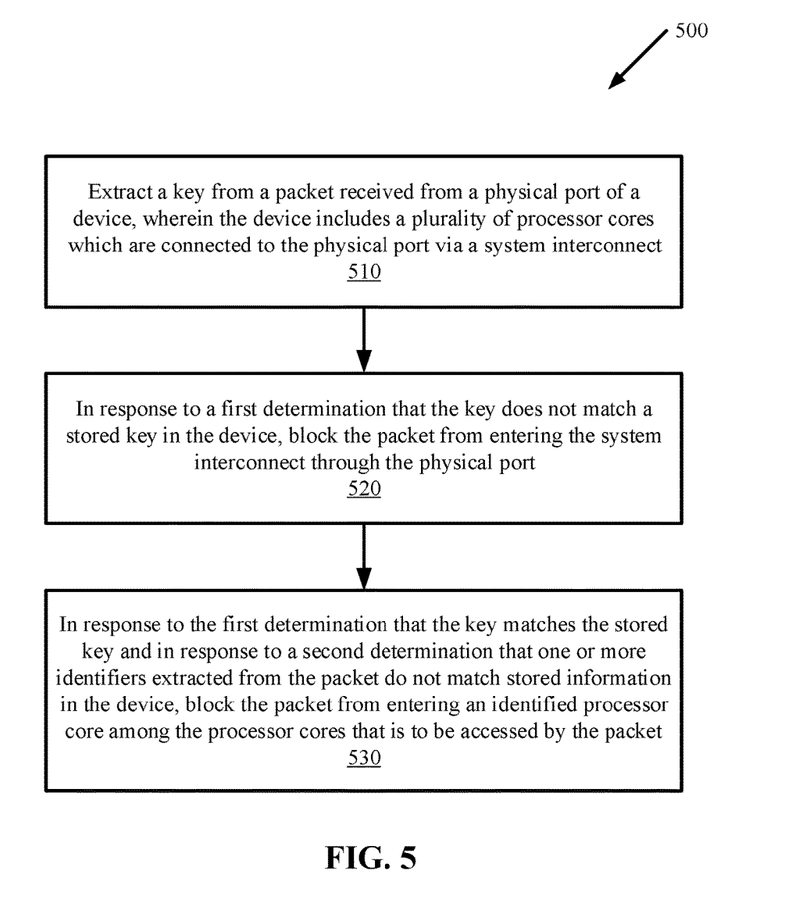
FIG. 5 is a flow diagram illustrating a method for secure operations of a networked device according to one embodiment.

FIG. 5 is a flow diagram illustrating a method 500 for secure operations of a device according to one embodiment. The device is connected to a network that includes a plurality of devices. The method 500 may be performed by the endpoint 150 of FIG. 1; more specifically, by a network security engine such as the network security engine 210 of FIG. 2. The method 500 may also be performed by the gateway 110 of FIG. 1.

In one embodiment, the device includes a plurality of processor cores which are connected to a plurality of physical ports via a system interconnect. The method 500 begins with the device extracting a key from a packet that is received from a physical port of the device (step 510). In response to a first determination that the key does not match a stored key in the device, the device blocks the packet from entering the system interconnect through the physical port (step 520). In response to the first determination that the key matches the stored key and in response to a second determination that one or more identifiers extracted from the packet do not match stored information in the device, the device blocks the packet from entering an identified processor core among the processor cores that is to be accessed by the packet (step 530). In one embodiment, the one or more identifiers include a process ID identifying a process assigned to the identified processor core. Additionally or alternatively, the one or more identifiers include an address identifier identifying a memory location allocated to the identified processor core; or the one or more identifiers include a target object identifier identifying an object having an allocated memory location to be processed by the identified processor core.

The operations of the flow diagrams of FIGS. 4 and 5 have been described with reference to the exemplary embodiments of FIGS. 1-3. However, it should be understood that the operations of the flow diagrams of FIGS. 4 and 5 can be performed by embodiments of the invention other than the embodiments of FIGS. 1-3, and the embodiments of FIGS. 1-3 can perform operations different than those discussed with reference to the flow diagrams. While the flow diagrams of FIGS. 4 and 5 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for secure operations of a device in a network including a plurality of devices, comprising:

extracting a key from a packet received from a physical port of the device, wherein the device includes a plurality of processor cores which are connected to the physical port via a system interconnect;

in response to a first determination that the key does not match a stored key in the device, blocking the packet from entering the system interconnect through the physical port; and in response to the first determination that the key matches the stored key and in response to a second determination that one or more identifiers extracted from the packet do not match stored information in the device, blocking the packet from entering an identified processor core among the processor cores, wherein the one or more identifiers identify a memory location in the device, and the stored information includes a memory address range allocated to a process executed by the identified processor core for processing the packet.

2. The method of claim 1, wherein the one or more identifiers include a process ID identifying the process for processing the packet.

3. The method of claim 1, wherein the one or more identifiers include an address identifier identifying the memory location in the device, and wherein the second determination includes determining whether the memory location is in the memory address range.

4. The method of claim 1, wherein the one or more identifiers include a target object identifier identifying an object allocated with the memory location.

5. The method of claim 1, wherein the packet includes a session ID identifying a network session established between the device and a source entity that sent the packet, the method further comprising:
blocking the packet by terminating the network session identified by the session ID.

6. The method of claim 1, wherein blocking the packet further comprises:
opening a first physical switch between the physical port and the system interconnect; or
opening a second physical switch between the identified processor core and the system interconnect.

7. The method of claim 1, wherein the key includes a group key, the method further comprising:
broadcasting a heartbeat message at a programmable time interval to other devices in the network that share a same group key.

8. The method of claim 7, further comprising:
in response to receipt of the heartbeat message from another device in the network sharing the same group key, re-activating disabled connections to the system interconnect from all physical ports and all of the processor cores in the device.

9. The method of claim 1, further comprising:
changing the key to an alternative key between the device and a source entity that sent the packet; and
blocking the packet in response to the source entity not having a valid response to the alternative key.

10. A device operative to perform secure operations in a network including a plurality of devices, comprising:
a plurality of processor cores;
a plurality of physical ports to receive packets;
a system interconnect coupled to the processor cores and the physical ports; and
a network security engine coupled to the processor cores and the physical ports, the network security engine operative to:
extract a key from a packet received from a physical port among the physical ports;
in response to a first determination that the key does not match a stored key in the device, block the packet from entering the system interconnect through the physical port; and
in response to the first determination that the key matches the stored key and in response to a second determination that one or more identifiers extracted from the packet do not match stored information in the device, block the packet from entering an identified processor core among the processor cores, wherein the one or more identifiers identify a memory location in the device, and the stored information includes a memory address range allocated to a process executed by the identified processor core for processing the packet.

11. The device of claim 10, wherein the one or more identifiers include a process ID identifying the process for processing the packet.

12. The device of claim 10, wherein the one or more identifiers include an address identifier identifying the memory location in the device, and wherein the second determination includes determining whether the memory location is in the memory address range.

13. The device of claim 10, wherein the one or more identifiers include a target object identifier identifying an object allocated with the memory location.

14. The device of claim 10, wherein the packet includes a session ID identifying a network session established between the device and a source entity that sent the packet, the network security engine is further operative to:
block the packet by terminating the network session identified by the session ID.

15. The device of claim 10, wherein the network security engine is further operative to:
block the packet by opening a physical switch between the physical port and the system interconnect or between the identified processor core and the system interconnect.

16. The device of claim 10, wherein the key includes a group key, the network security engine further operative to:
broadcast a heartbeat message at a programmable time interval to other devices in the network that share a same group key.

17. The device of claim 16, wherein the network security engine is further operative to:
in response to receipt of the heartbeat message from another device in the network sharing the same group key, re-activate disabled connections to the system interconnect from all physical ports and all of the processor cores in the device.

18. The device of claim 10, the network security engine is further operative to:
change the key to an alternative key between the device and a source entity that sent the packet; and
block the packet in response to the source entity not having a valid response to the alternative key.

19. A system operative to perform secure operations in a network, comprising:
a plurality of devices; and
a gateway coupled to the devices via the network to manage the devices;
at least one of the devices further comprising:
a plurality of processor cores;
a plurality of physical ports to receive packets;
a system interconnect coupled to the processor cores and the physical ports; and
a network security engine coupled to the processor cores and the physical ports, the network security engine operative to:
extract a key from a packet received from a physical port among the physical ports, wherein the key includes a group name identifying a group of the devices;
in response to a first determination that the key does not match a stored key in the device, block the packet from entering the system interconnect through the physical port; and
in response to the first determination that the key matches the stored key and in response to a second determination that one or more identifiers extracted from the packet do not match stored information in the device, block the packet from entering an identified processor core among the processor cores, wherein the one or more identifiers identify a memory location in the at least one device, and the stored information includes a memory address range allocated to a process executed by the identified processor core for processing the packet.

20. The system of claim 19, wherein the one or more identifiers include a process ID identifying the process for processing the packet.

21. The device of claim 19, wherein the one or more identifiers include an address identifier identifying the memory location, or a target object identifier identifying an object allocated with the memory location, and wherein the second determination includes determining whether the memory location is in the memory address range.

22. The system of claim 19, wherein each trusted node is a Wi-Fi portable access point.

* * * * *